D. MACKINNON.
Stylographic Fountain-Pen.
No. 8,802. Reissued July 15, 1879.
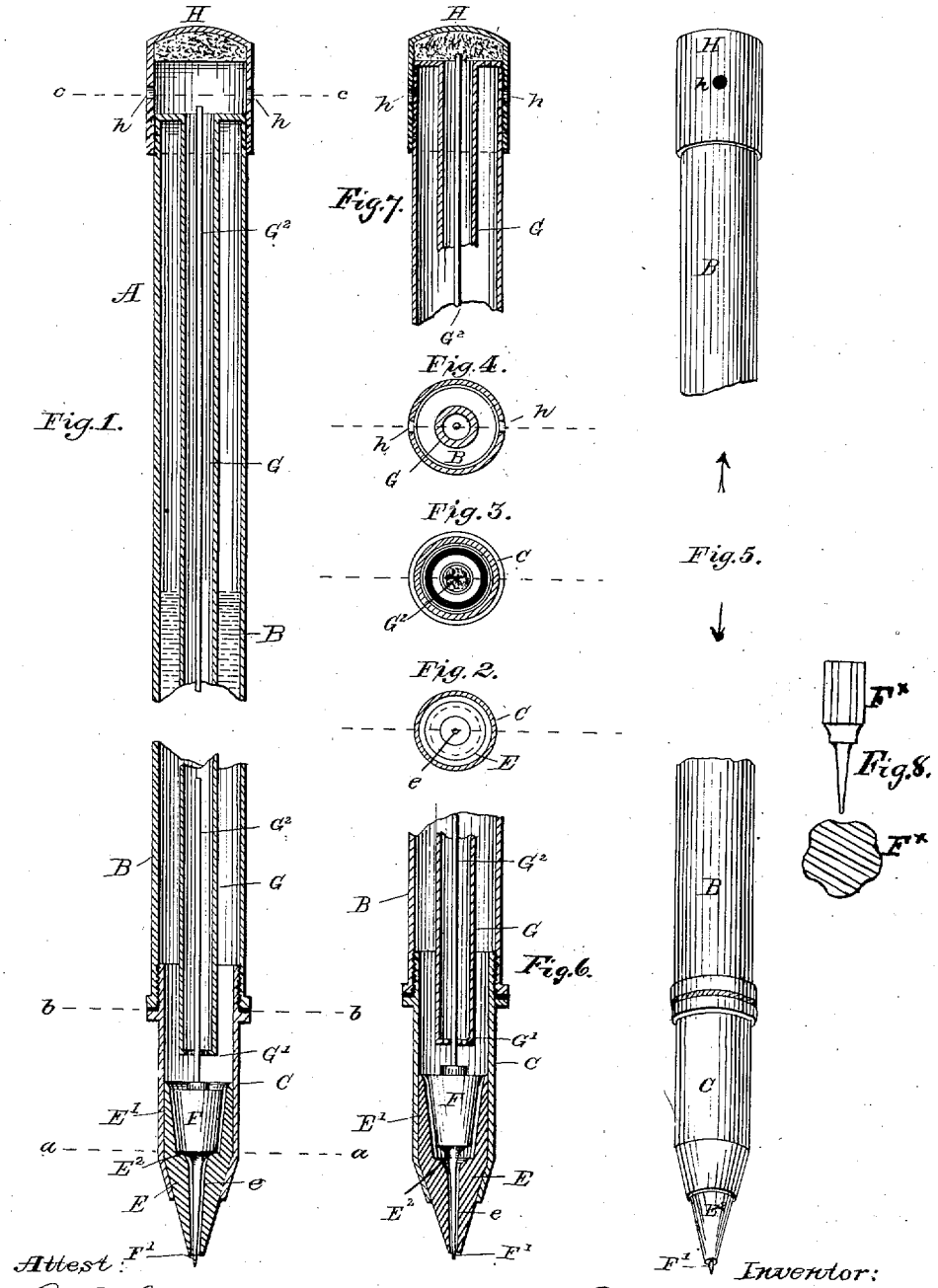
Attest:
R. F. Barnes
D. P. Cowl
Inventor:
Duncan Mackinnon
Per Wm. H. Brereton Atty.

UNITED STATES PATENT OFFICE.

DUNCAN MACKINNON, OF LUCKNOW, CANADA.

IMPROVEMENT IN STYLOGRAPHIC FOUNTAIN-PENS.

Specification forming part of Letters Patent No. 174,965, dated March 21, 1876; Reissue No. 8,802, dated July 15, 1879; application filed March 7, 1879; patented in Canada June 5, 1875; patented in England July 12, 1875; patented in France June 2, 1876.

*To all whom it may concern:*

Be it known that I, DUNCAN MACKINNON, of Lucknow, (formerly of Stratford, Ontario, Canada,) in the county of Bruce and Dominion of Canada, have invented certain new and useful Improvements in Stylographic Fountain-Pens; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to that class of stylographic fountain-pens wherein a tubular writing-point is used in lieu of the ordinary writing-pen; and the said invention consists, first, in a two-part holder or writing implement, composed of a handle-reservoir hermetically closed at the top and a removable tapering writing portion, united together near the writing end, a valve located in said writing portion, and an air-supplying tube extending through the reservoir into the writing-end; second, in the combination of a gravitating-valve, tapering spindle or needle attached to and forming a part of said valve, made of such length as to project slightly from the writing-point, for the purpose of automatically controlling the flow of ink in the act of writing, and an air-supplying tube extending through the reservoir, and terminating near the top of the valve, for making the flow of ink steady and regular; third, in the combination of the writing-end of the pen, perforated with a fine central tapering bore, with tapering needle fitting within said bore and extending slightly from the outside end thereof, and air-supplying tube, terminating near the lower interior end of the pen, for the purposes specified; fourth, in making the air-tube to extend down or terminate within the reservoir at a point near the top of the valve, for the purpose of conducting the air near the point, steadying the column of ink, and limiting the upward movement of said valve; fifth, in a novel construction of the valve; and, sixth, in certain novel combinations and arrangements of the parts, all as and for the purposes hereinafter more fully set forth and claimed.

The pen in which is embodied my invention, as hereinafter set forth, is provided with a tapering writing-point, made of glass, metal, or other suitable material, placed at the foot of and in combination with a reservoir of ink, the said writing-point being held in a detachable holder, and centrally perforated with a fine bore or hole, through which the ink is led down from the reservoir to the paper in a thin thread-like stream. An automatically-acting valve is seated within the top portion of the writing-point proper, closing the ink bore or duct, and a spindle attached to the said valve, passing downward through the bore of the writing-point, the duty of the valve being to shut off the flow of ink when the operator ceases writing, and the duty of the spindle, in combination with the valve and air-tube, being to start and keep up a continuous and even flow of ink.

The valve consists of a properly weighted and fitted head, to which is attached a fine tapering spindle of metal passing downward through the bore of the writing-point, and extending a short distance beyond the extremity of the said writing-point when the pen is not in use. Thus the operator, when he places the point on the paper, lifts the valve, allowing the ink to flow, and the said valve, being of sufficient weight, and moving in a chamber corresponding somewhat with it in form, again rests in its seat when the point is raised and shuts off the flow of ink.

An air-conducting tube passes downward through the center of the ink-reservoir, and terminates near the lower end of the said reservoir. This air-tube is either left open or partly closed by a perforated diaphragm at its lower end. The object of the air-tube is to assist the downward flow of the ink from the reservoir, and at the same time to steady the regular flow therefrom. A rod is placed within and extends down the whole length of the air-tube, the lower enlarged end resting on the top of the writing-point valve, in combination with a cap, the object of the rod being to enable the valve to be held to its seat, to prevent the escape of ink when the pen is not in use. By extending the air-tube down to a point near the lower end of the pen other useful purposes are accomplished besides that of making the flow of ink even and regular, such as steadying and controlling the column of ink by the mechanical support it gives, and by the lateral and upward pressure of the air. The end of the air-tube also serves as a stop to limit the upward movement of the valve and needle, so that the valve and needle are at all times confined in place, and cannot become displaced from their proper position on the inversion of the pen, which would be the case were there no stop.

In the drawings, Figure 1 is enlarged sectional views of an instrument constructed according to my invention. Fig. 2 is a sectional plan at *a a* of the same. Fig. 3 is a sectional plan at *b b* of the same. Fig. 4 is a sectional plan at *c c* of the same. Fig. 5 is an elevation. Fig. 6 is a sectional view of the writing portion of the pen, showing the valve as raised from its seat; Fig. 7, a sectional view of the top portion of the pen, showing the cap as down tight in place against the rod, instead of removed, as in Fig. 1.

A is the instrument, consisting of two main parts, the reservoir B and the writing-point holder C. The reservoir B is a tube of any suitable diameter, hermetically closed at the upper end, and constructed preferably of a metal or other material non-corrosive under the action of ink. The tube is tapped at the lower end to receive the threaded end of the detachable writing-point holder C, which holder is also preferably composed of a non-corrosive substance. The upper portion of the holder for a suitable distance is a parallel cylinder, the remainder tapering regularly to a smaller diameter, forming a seat for and containing the major portion of the writing-point E. The writing-point E is made of glass, of a non-corrosive metal, or of any other non-corrosive material suitable for the work. It is a hollow parallel cylinder at its upper end, $E^1$, for a suitable distance, but finishes downward therefrom to a point of suitable fineness in a regular taper, centrally perforated by a fine bore or ink-duct, *e*, which bore is closed at the upper end by a valve, F. The entrance $E^2$ of this bore is funnel-shaped.

The upper interior portion of the writing-end of the pen or pen-point, containing the valve, is made somewhat smaller than the diameter of the handle-reservoir, and of a slightly greater diameter than its contained valve. The object of this is to hold and guide the valve in its proper position, but at the same time permit a free egress of ink around the same.

To the valve F is attached a fine spindle, F′, which passes downward through the bore *e*, projecting a short distance beyond the extreme end of the writing-point. A suitable seat is formed for the valve F to rest upon, in order that there may be no leakage when the valve is in place. The sides of the valve may be plain, grooved, or tapering, as desired.

By constructing the valve, as shown in Fig. 8, with grooved or corrugated sides, the chamber in the end of the pen may be of just sufficient diameter to receive the valve. Thus space is economized, and the valve is held in proper position at all times, and no impediment to the free passage of ink is offered.

G is an air-conducting tube, leading from the top of the reservoir, and terminating at a point a short distance above the top of valve F. The lower end of this tube is either left open or partially closed by a perforated diaphragm, $G^1$.

$G^2$ is a rod passing upward through the tube G. H is a capping-piece, fitting on the outside of the upper end of ink-reservoir, and perforated with one or more inlet air-holes, *h*. The inner face of the crown of this cap is lined with rubber or other suitable material, and may be adjusted by moving the cap up or down to relieve or bear against the top of the rod $G^2$, with the object of firmly closing the ink-valve on its seat to prevent the escape of ink from the point, and further to close the top of the air-tube to prevent the leakage of ink from the top when the pen is not in use.

Having now fully defined the parts of my invention, its operation may be described as follows: For the purpose of this description, the reservoir is supposed to be filled with ink and the pen in the hand of a writer. The moment the paper is touched to commence writing the spindle F′ is pushed up, lifting the valve F, and allowing the ink to flow to the point in a thin thread-like stream of a uniform size, which stream is transferred to the paper and fashioned into words by the motions of the operator in the usual way. Every time the operator lifts his pen the valve F closes immediately, shutting off the supply of ink, if only for the instant, between the formation of detached letters. This constant lifting and lowering of the valve and spindle, in combination with the air admitted by the tube, starts and keeps up an even flow of ink down the bore to the point of pen, and also prevents any granular or sticky accumulation or deposit.

To replenish the reservoir, unscrew the part C, nearly fill the chamber around the air-tube, and screw the piece C on again. The joint between the two pieces is made water-tight by any of the usual means, such as a leather or rubber washer.

In the construction of the different parts of my invention I do not wish to be understood that I confine myself to the use of any specified material; but I prefer and advise that non-corrosive substances should be employed, especially in the construction of the writing-point and operating-valve. Further, while the cylindrical portion $E^1$ of the writing-point is not necessary to the perfect operation of the instrument, still it may be used, both because it affords a means of fastening the point to the holder and a receptacle for the ink-valve.

Having thus fully described my invention and the operation thereof, what I claim as new, and desire to secure by Letters Patent, is—

1. The two-part holder, composed of a handle-reservoir hermetically closed at the top and a removable tapering writing portion, united together near the writing end, a valve located in said writing portion, and an air-tube extending through the reservoir into the writing end, for the purposes specified.

2. The combination of gravitating valve and tapering spindle forming part of said valve, for governing the flow of ink in the act of writing, and an air-supplying tube extending through the reservoir and terminating near the top of the valve, for making the flow of ink steady and regular.

3. The combination of the writing end of the pen, perforated with a fine tapering bore, with tapering spindle or needle fitting within said bore, and air-supplying tube terminating near the lower interior end of the pen, for the purposes specified.

4. In combination with a pen-case provided with a valve at its lower end, an air-supplying tube terminating in close proximity to said valve, whereby air is delivered at the lower interior end of the pen-case and a stop is formed for said valve.

5. In combination with the reservoir B, closed at its top, the air-tube G, opening through said top and extending entirely through said reservoir, substantially as and for the purposes described.

6. The combination and arrangement of reservoir B, writing portion C, and air-tube G, terminating in the writing portion, whereby air is supplied to the lower end or portion of the column of ink, for the purposes described.

7. The point E, perforated with a fine central tapering bore, and terminating in its top in a flaring or funnel-shaped valve-seat, $E^2$, in combination with a valve resting in a vertical position within said seat, and its tapering needle fitting within said bore.

8. In combination with the writing-point, formed with a tapering bore, the valve and tapering needle or spindle secured to said valve and fitting within the tapering bore of the point, substantially as and for the purposes described.

9. The air-tube G, extending to a point in the ink-reservoir near the writing-point, combined with said writing-point E, having the valve-chamber $E^1$, ink-duct *e*, and gravitating valve F, substantially as and for the purposes described.

10. In combination with the writing portion of the pen, perforated with a fine tapering bore, the valve F, Fig. 8, constructed with recessed or corrugated sides and tapering needle or spindle, whereby the valve is made to fit tight within its chamber, but at the same time a free egress of ink past the same is permitted.

11. The writing-point E, having a valve-chamber, $E^1$, and tapering ink-duct *e*, the gravitating valve F, with tapering spindle $F'$, rod $G^2$, and the tube C, combined in a detachable manner with the tube B, having the air-tube G, substantially as and for the purposes specified.

12. The perforated cap H, combined with the tube or ink-reservoir B C, air-tube G, terminating near the lower end of the pen, writing-point E, gravitating valve F, spindle $F'$, and independent rod $G^2$, extending from the top of the pen and resting upon the valve, substantially as and for the purposes described.

In testimony that I claim the foregoing I have hereunto set my hand this 12th day of February, 1879.

DUNCAN MACKINNON.

Witnesses:
DANIEL PATTERSON,
ANGUS MACKINNON.